United States Patent [19]

Nagahara et al.

[11] Patent Number: 4,951,160
[45] Date of Patent: Aug. 21, 1990

[54] IMAGE REPRODUCING APPARATUS

[75] Inventors: Yasumori Nagahara, Yokosuka; Kenichirou Asada, Tokyo; Takanobu Fujioka, Chofu; Yoshiaki Kanmoto, Machida; Mitsuo Hasebe, Tokyo; Kiyoto Nagasawa; Akio Katsumata, both of Yokohama; Setsuo Soga, Tokyo, all of Japan

[73] Assignee: Ricoh Company, Ltd., Tokyo, Japan

[21] Appl. No.: 374,783

[22] Filed: Jul. 3, 1989

[30] Foreign Application Priority Data

Jul. 5, 1988 [JP] Japan .................. 63-166034

[51] Int. Cl.⁵ .............................. H04N 1/04
[52] U.S. Cl. .................. 358/496; 358/401; 358/431
[58] Field of Search ............ 358/486, 401, 431, 354, 358/400

[56] References Cited

U.S. PATENT DOCUMENTS

| | | | |
|---|---|---|---|
| 4,367,493 | 1/1983 | Matteson | 358/486 |
| 4,426,653 | 1/1984 | Komada | 358/486 |
| 4,631,577 | 12/1986 | Yamanishi | 358/401 |
| 4,755,877 | 7/1988 | Vollert | 358/401 |
| 4,862,485 | 12/1989 | Maeshima | 358/401 |

FOREIGN PATENT DOCUMENTS

| | | |
|---|---|---|
| 59-184381 | 4/1983 | Japan . |
| 59-188673 | 4/1987 | Japan . |
| 62-208070 | 9/1987 | Japan . |

Primary Examiner—Edward L. Coles, Sr.
Attorney, Agent, or Firm—Oblon, Spivak, McClelland, Maier & Neustadt

[57] ABSTRACT

An image forming apparatus includes a fixing speed setting unit for selectively setting the fixing speed in accordance with a desired mode of operation, a fixing unit for fixing a reproduced image of an original formed on a image forming medium at a variable fixing speed in accordance with the fixing speed setting unit, and a scanning unit provided with opto-electrical elements arranged in one line extended laterally to a predetermined scanning direction for optically receiving an image of the original through the opto-electrical elements. The opto-electrical elements are carrying out a scanning operation in the predetermined scanning direction with varied scanning speed by changing a sweep spacing of an image data with averaging every N line of the image data in accordance with the operation mode with using every N−1 lines of the image data to reproduce the image of the original on the image forming medium.

16 Claims, 8 Drawing Sheets

IMAGE REPRODUCING APPARATUS

BACKGROUND OF THE INVENTION

The present invention generally relates to an image reproducing apparatus. More particularly, the present invention relates to an image reproducing apparatus of the type in which an image reader separates an image of an original into a plurality of color components, and reads the image data of the plurality of color components, the image data of the color components are converted into the record image data of each record color, and the color recording units are operated in accordance with the record image data, to reproduce a color image of the original image.

Recently, a digital copying machine of the electrophotography type in which an original is scanned by deflecting a laser beam modulated by an image signal, has widely been marketed. There are other types of digital copying machines, such as ink jet type copying machines and the thermal transfer type copying machines. Of those types of digital copying machines, the digital copying machine of the electrophotography type is advantageous in that a copying speed can readily be increased and the running cost is low.

This type of the digital copying machine is disadvantageous in picture quality. This is due to the structure of the fixing stage. Particularly in the color image, the picture quality problem is remarkable. Generally, a color image is formed by mixing toners of three colors, yellow, magenta and cyan in a subtractive mixture method. This brings about many disadvantages. For example, The toner layer of the resultant color image is thicker than that of the monochromatic image. Toner fusing heat as required is high. A limited power distribution can provide unsatisfactory printed or reproduced pictures. More exactly, the flatness and gloss of the printed picture are poor.

A color image formation is also known, in which a color image is once formed on an overhead projector sheet (OHP) of resin, and the light transmitted through the OHP is used for the image formation. In this type of the color image formation, the requirements for the toner fusing and the flatness of the printed image surface are more strict. The color reproduction by the reflected light is satisfactory, but that by the transmitted light provides a gloomy picture. In the extreme case, the picture quality is below a practical level.

The above problems have been pointed out by Japanese Patent Application Laying-Open (KOKAI) No. 60-211483 which proposes to decrease the speed of rotation of the fixing heat roller in forming an image on the OHP sheet. The color copying machines designed on the basis of the proposal have bee developed and marketed.

In the copying machine of this type that practically used, the speed of rotation of the fixing heat roller is indeed reduced, but the process linear velocity in the developing and transfer stages cannot be changed. Accordingly, if the paper still under transfer process enters the fixing rollers, two different velocities are applied to the paper, the paper becomes less tense, and the unfixed toner possibly rubs on the mechanical part. To cope with this, the paper transport path is designed to have a satisfactory distance between the image transfer point and the fixing unit. This approach, however, makes the copying machine bulky. A measure taken for the bulky problem by some copying machines is to limit the OHP sheet to small size sheet, e.g., A4 size. In this sense, the measure succeeds in holding back the elongation of the transport path. Another copying machine has been proposed in which the the process linear speed of the development and transfer is changed and set at a desired linear velocity of the fixing rollers. In other words, the copying machine is designed to operated at two different copying speeds. The proposal has smoothly be introduced into the digital copying machines other than that of the laser beam scanning type. So far as we know, the digital copying machine based on the proposal has not been developed yet. Japanese Patent Application Laying-Open (KOKAI) No. 57-104102 discloses a technique using a plurality of rotating mirror scanners in which the mirror scanners are appropriately switched to change a scanning speed of the laser beam. The technique obviously increases the cost to manufacture, because of using many expensive mirror scanners. Some specific numbers of mirror surfaces make it difficult to design lens. In the case of the polyhedron mirror, a displacement of the deflecting point, called a sag, depends on the number of surfaces of the mirror. The displacement affects a curvature of the image surface in the sub-scanning direction. Accordingly, when the number of the mirror surfaces and the mirror size are selected to be some specific values, designed tolerances of the mirror cannot be satisfied.

The scanning speed in the main scanning direction is also changed. This requires change of the picture element clock frequency and the optical conditions.

SUMMARY OF THE INVENTION

Accordingly, an object of the present invention is to provide an image reproducing apparatus for reproducing an image of an original by scanning the original to form an image of the original on an image forming medium and by fixing the formed image on the medium, a scanning speed of the scanning operation being variable in synchronization with a fixing speed of the fixing operation.

To achieve the above object, there is provided a digital image forming apparatus comprises a fixing speed setting unit for selectively setting the fixing speed in accordance with a desired mode of operation, a scanning unit provided with the opto-electrical elements arranged in one line extended laterally to a predetermined scanning direction for optically receiving an image of the original through the opto-electrical elements, the opto-electrical elements carrying out a scanning operation in the predetermined scanning direction to produce an image data representing a whole image of the original, an electrical scanning speed of the opto-electrical elements being varied by changing a sweep spacing of the image data while a mechanical scanning speed of the opto-electrical elements being kept at a constant, and a fixing unit for fixing a reproduced image of an original image formed on the image forming medium at variable fixing speed in accordance with the mode of operation.

Preferably the image reproducing apparatus further comprises an image processing unit for producing a modulation signal in accordance with the image data so as to control a moving speed of the image carrier member. Preferably the image reproducing apparatus further comprises exposure unit for producing an image forming signal from the modulation signal so as to reproduce a latent image of the original image on the image carrier member by the image forming signal at a speed variable with the fixing speed.

Preferably the image reproducing apparatus further comprises developing unit for developing the latent image on the image carrier member.

Preferably the image reproducing apparatus further comprises transferring unit for transferring a developed image to the image forming medium from the image carrier member at a speed controlled by the fixing speed setting means.

With such an arrangement, according to the mode of operation, such as a color image reproduction or print on a paper and a color image print on an OHP sheet, the speed of reading an original image is changed, and a fixing speed of the fixing rollers for fixing the reproduced image and a moving speed of a photosensitive drum for image formation as the image carrying means are changed and set at the changed image reading speed. Accordingly, the resultant image forming apparatus is compact in size, and is capable of reliably reproducing the original image in any mode of the operation.

Further objects, features and advantages of the present invention will be apparent from the following description of the preferred embodiments of the present invention as illustrated in the accompanying drawings, in which:

DESCRIPTION OF THE PREFERRED EMBODIMENTS

The present invention will be described in detail with reference to some specific embodiments.

A fixing means to be used is a modification of an ordinary monochromatic image fixing unit. Generally, the color toner layer is likely to be thick in forming a color image. If the fusing and mixing of color toners are satisfactory, the color development of the printed image is poor. Color of such a printed image sometimes is much different from that of an original image.

Particularly in case that a color image is once formed on a transparent sheet, and for image formation light is transmitted through the transparent sheet bearing the color image, the unfused toner of the color image remaining on the transparent sheet renders the toner surface irregular. Therefore, the light projected to the sheet is intricately refracted. The irregular surface of and air present among the unfused toner particles in the toner layer substantially reduce the light traveling in parallel with the direction of the projected light. The undesirable matters present in the whole thickness of the toner layer affects the transmitted light. Accordingly, the requirements for the fixing is more strict than those for the fixing of the image obtained by using the reflecting light. The strict requirements for the fixing may be eased to some extent by adjusting the length of a nip directly distributing to the fixing of image as viewed in the direction of the travelling of a means on which an image is transferred and fixed, such as paper and transparent sheet, (referred to as an image-transferred means), or by adjusting a peripheral speed of the fixing rollers as the fixing means. However, there is a limit in increasing the surface temperature of the fixing rollers or increasing the roller pressure for the purpose of the nip length elongation.

The present invention has succeeded in solving the above problems by the technical idea involving the changing of a moving speed of the image-transferred means transported toward the fixing rollers between a fixing speed for fixing an ordinary image-transferred means and a fixing speed for fixing an image-transferred means of large heat capacity or a transparent image-transferred means.

Figure 1:
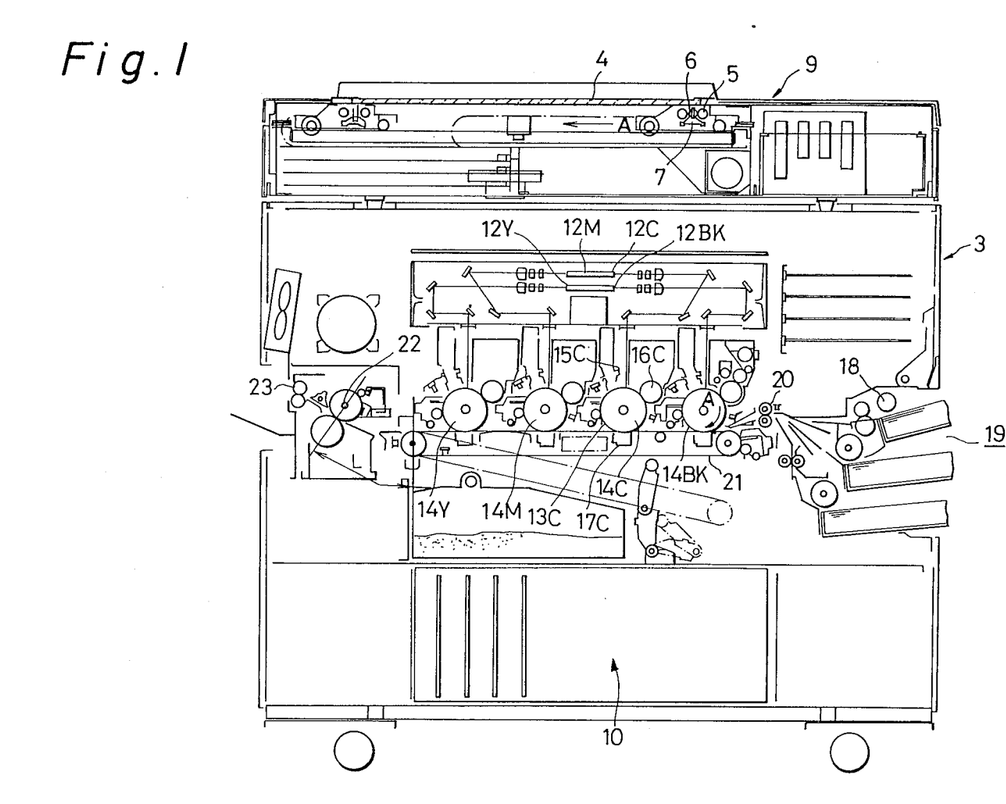
FIG. 1 shows a longitudinal sectional view of a color digital copying machine as an example of the image reproducing apparatus.

Referring to FIG. 1, there is shown a color copying machine as an example of the image forming apparatus. The copying machine is made up of a scanner section 9 for reading an original image, an image processing section 10 for appropriately processing image signals that are outputted in the form of digital signals from the scanner section 9, and a printer section 3 for forming an image on a paper by using the image print data of the respective colors derived from the image processing section 10. The scanner section 9 is provided with an illuminating means 5, e.g., a fluorescent lamp, for illuminating an original placed on a document table 4 in a scanning manner. The light reflected by the original is focused at a 100%-magnification color image sensor 7 by a 100%-magnification image forming element 6. The image sensor 7 separates the color of the image into the three primary colors, red R, green G and blue B, for example, and produces electrical signals representative of the color information of R, G and B. The image sensor 7 is constructed with five chips (not shown) each including R, G and B filters arranged in successive order. An assemblage of the lamp 5, element 6 and image sensor 7 is moved in the direction of arrow A to scan the original. The element 6 may be a dichroic prism capable of simultaneously separating the image color into the colors R, G and B through one scanning.

The image data converted is digitized and outputted to the image processing section 10. The image processing section 10 appropriately processes the digital image data to convert the data into image data of different colors black (Bk), yellow (Y), magenta (M) and cyan (C) for color image formation.

In the instance of FIG. 1, four colors Bk, C, M and Y are used, but only three colors may form a color image, if necessary. In the latter case, one set of the print unit is omissible in the copying machine of FIG. 1.

The signal from the image processing section 10 is inputted to a printer section 3 and are distributed into laser devices of the respective colors, 12Bk, 12C, 12M and 12Y.

In the printer section 3, four sets of print units 13Bk, 13C, 13M and 13Y are disposed side by side. These four print units have substantially the same constructions, and hence one print unit 13C will be typically described, for simplicity. The like portions in those print units are designated by like symbols attendant with subscripts representing those colors.

The print unit 13C is provided with a photosensitive means 14C, such as a photosensitive drum, that is located outside the laser device 12C.

A charger 15C, exposure unit having the laser device 12C, developing unit 16C, transfer charger 17C, and the like are disposed around the photosensitive drum 14C.

The surface of the photosensitive drum 14C is uniformly charged by the charger 15C. Then, it is exposed to the laser beam emitted by the laser device 12C, so that a latent image of a cyan image is formed on the drum surface. The drum with the latent image is developed by the developing unit 16A, to form a toner image. Sheet of paper supplied from a paper supply section 19, e.g., one of three cassettes, by a paper feed roller 18, is nipped at its leading end by a regist roller pair 20, and the timing of paper movement is adjusted. Then, the paper is transported onto a transfer belt 21. By the belt 21, the paper is moved to the photosensitive drums 14Bk, 14C, 14M and 14Y carrying toner images of the respective colors, successively. By the operation of the transfer charger 17, the toner images are successively transferred to the paper. The image transferred paper is fixed by a fixing roller pair 22, and is discharged to outside by an exit roller pair 23.

The paper is transported at the same speed as that of the transfer belt, because it is electrostatically attracted to the belt.

Figure 3:
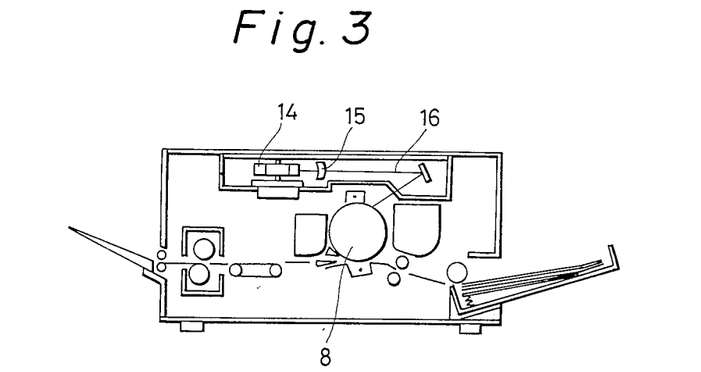
FIG. 3 is a longitudinal sectional view of a monochromatic digital copying machine.

A relationship between a scanning speed of the original Vs and a read signal of the photo sensor is as shown in FIG. 3. The length of the light receiving area of the sensor as viewed in the sub scanning direction is "d", and the length of the area extending in the main scanning direction is approximately equal to the size of one picture element (pixel) Pm. Assuming that a charge storage time is $t_{CCD}$, a distance l scanned is $$l = V_s \cdot t_{CCD} \quad (1)$$

During the period of scanning the distance l, charge is stored, and shifted to a shift register at the periods of $t_{CCD}$. During this period $t_{CCD}$, a signal stream obtained by reading in the main scanning direction is serially transferred in synchronism with a transfer clock signal.

At its simplest, the period $t_{SCN}$ of the transfer clock is expressed $$t_{SCN} = t_{CCD}/m \quad (2)$$

where m is the number of pixels arrayed in the main scanning direction.

The length of the pixel Ps extending in the sub-scanning direction is $$Ps = l = V_s \cdot t_{CCD} \quad (3)$$

The read signal represents a light amount of the integration of the area $Pm \times Ps$.

Figure 2:
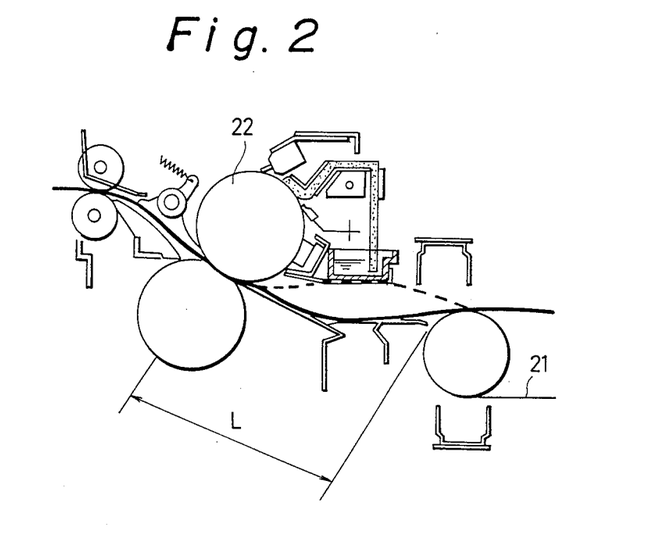
FIG. 2 is a partial sectional view showing the structure of the copying machine of FIG. 1, which includes a transfer section and a fixing section.

In designing a transport section such that a distance L between the end of the transfer stage and the fixing stage is satisfactorily longer than the image-transferred means, as shown in FIG. 2, if the speed in the fixing stage and the transport section is changed in two steps, any problem is created.

When the distance L is short as shown in FIG. 1, the unfused toner image surface is warped and comes in contact with the mechanical part near the passing image-transferred means. Therefore, a normal color image cannot be obtained.

If the distance L is selected to be longer than the length of the image-transferred means, the warping problem can be solved. In the case of the copying machine with a plurality of image carrying means arranged side by side, as shown in FIG. 1, the length of the copying machine is necessarily long. If the long distance L is additionally introduced, the long copying machine is further long. This must be avoided. The size increase problem can readily be solved by changing the speed of the fixing roller pair, and changing the the speed of transporting the image-transferred means to the changed speed of the fixing roller pair. This can be realized in a manner that with the change of the fixing speed, the image forming speed is changed.

Figure 4:
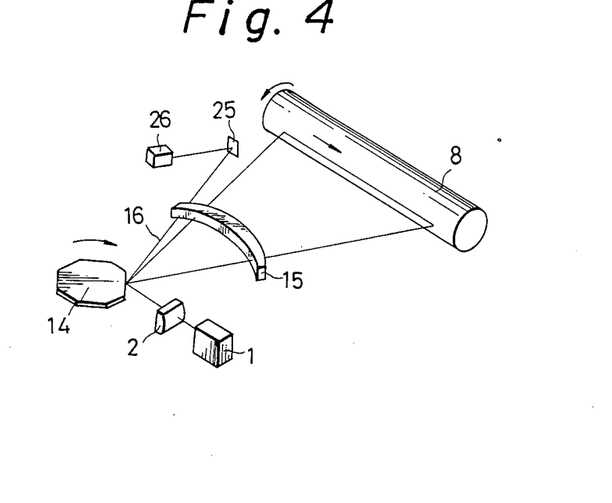
FIG. 4 is a schematic illustration of a laser beam scanning system used in the copying machine of FIG. 3.
Figure 5:
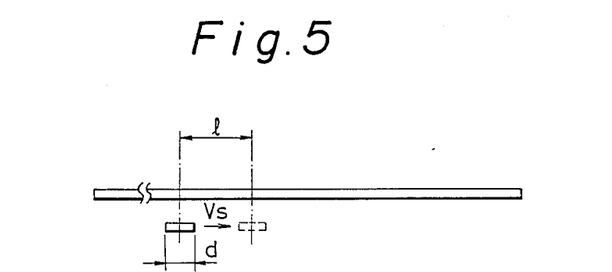
FIG. 5 is an explanatory diagram showing a relationship between the scanning speed of the original Vs and a read signal by a photo sensor.

An optical system for laser beam scanning will be described. FIG. 3 shows a longitudinal sectional view showing an example of a monochromatic digital copying machine. FIG. 4 shows an explanatory diagram for explaining an optical system for the laser beam scanning. A light source 1 as a semiconductor laser device emits a bundle of parallel laser beams to be modulated by current.

The laser beam travels through a cylindrical lens 2, a rotating mirror scanner 14, and a $f\theta$ lens 15, and projects a light spot of a preset diameter on the surface of a photosensitive means 8, such as a photosensitive drum. With rotation of the mirror scanner 14, the light beam rectilinearly scans on the drum surface at a constant speed. During a period that the laser beam scans a predetermined distance on the drum surface, the drum 8 rotates by one line. Repeating the operation, the scanning lines closely fills the drum surface in successive order.

A part of a laser beam is reflected at a mirror 25, and directed toward a photo sensor 26. The sensor 26 produces an output signal every scanning line. A signal stream derived from the sensor 26 is used as a line synchronous signal LSYNC. A time point after a predetermined time elapse from the generation of the synchronous signal LSYNC is used as a start point of the image writing operation, thereby to secure an alignment of the main scanning directions.

The number of revolutions N (rpm) of the mirror scanner 14 is expressed by $$N = v/(p \cdot f) \quad (4)$$

where
f: number of faces of the mirror scanner
v: linear speed (mm/sec) of the photo sensitive drum,
p: pixel pitch (mm) in the vertical scanning.

The above equation shows that if the pitch "p" of the pixels arrayed in the sub-scanning direction and the number of the mirror faces "f" are fixed at values, the number of revolutions N of the mirror scanner is proportional to the linear velocity "v" of the drum. Therefore, the change of the linear velocity "v" is equivalent to the change of the revolution number N of the mirror scanner. In the case of the rotating mirror scanner 14, the requirement for the stability of the rotating speed is very strict. To obtain an easy change of the speed, it is necessary to use a high performance speed control circuit capable of stably controlling the rotating speed in a wide range of frequencies or to use the control circuits, which are provided for the different rotating speeds of the mirror scanner respectively. In this case, accordingly, the control circuit is expensive and a design freedom of the drive motor is limited.

When the rotating speed of the mirror scanner 14 is changed, the scanning speed of each line, i.e., the speed of the main scanning, also changes. Therefore, the pixel clock frequency for driving the laser device and for modulating the laser beam must be changed. Consequently, the optical conditions, such as the power of the laser device and the duration of the laser beam emission, must be changed. Further, the exposing energy of the laser beam must be halved.

To change the linear velocity of the copying process, different control circuits or a reference oscillator by convention is assembled into the machine. To realize this by a single device, an increased number of parts or expensive, high performance parts must be used, resulting in an expensive copying machine.

The equation (4) shows that to change the linear velocity "v" with the same number of revolutions N, change of the number of mirror faces "f" suffices. For example, the linear velocity "v" is changed to ½, if the number of mirror faces "f" is set to ½, the revolutional number N and the pitch "p" may remain unchanged.

Figure 6:
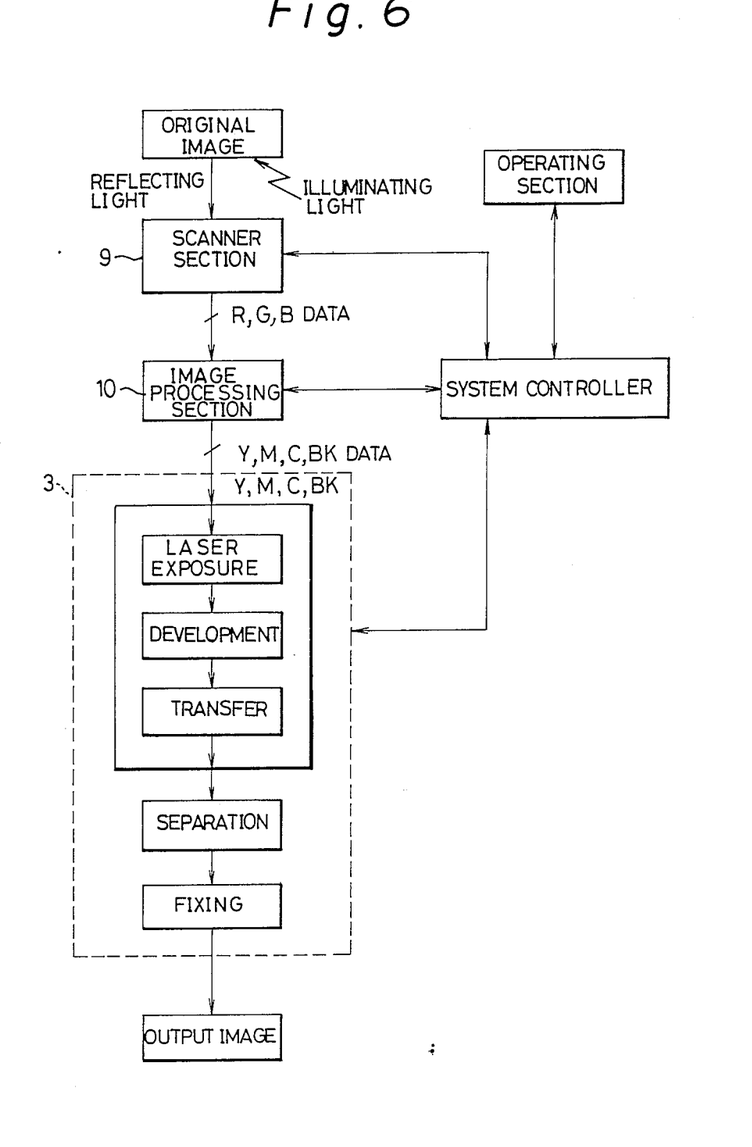
FIG. 6 is a flowchart showing a flow of operations of the digital copying machine of FIG. 1.
Figure 7:
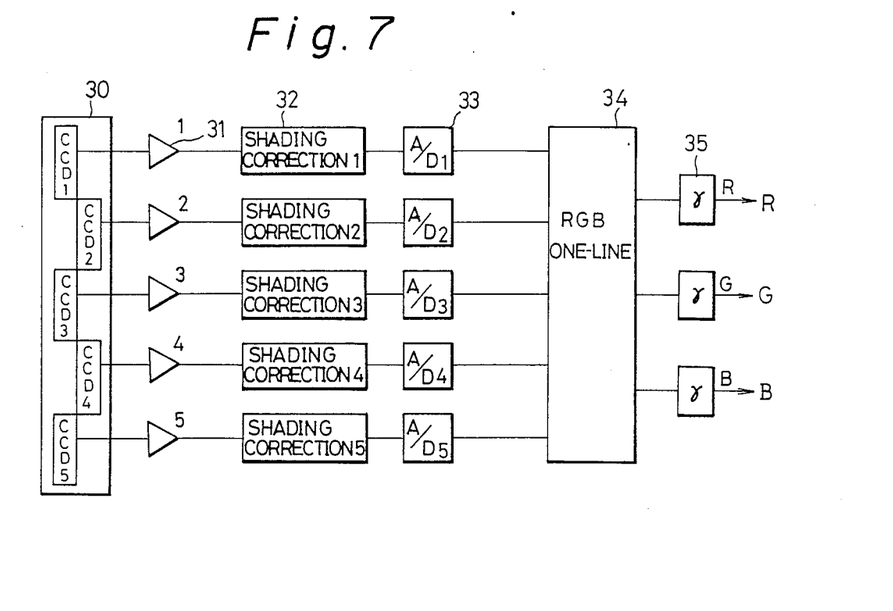
FIG. 7 <:s a block diagram of a signal processing circuit of a scanner section of the copying machine of FIG. 1.
Figure 8:
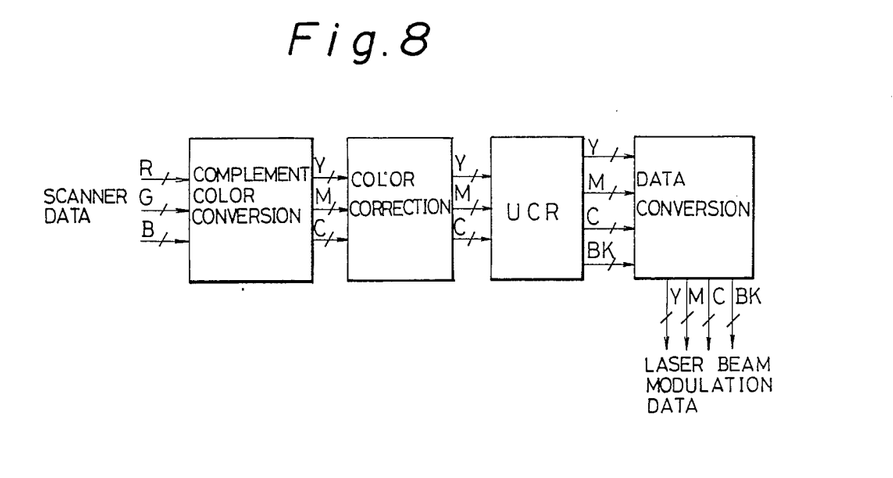
FIG. 8 is a block diagram of a signal processing section of the copying machine of FIG. 1.

FIG. 6 shows a flowchart showing the operation of the copying machine of FIG. 1. FIG. 7 shows block diagrams of signal processing of the scanner section 9. Color separation signals obtained through the photoelectric conversion process are subjected to a shading correction process. The shading correcting process is for correcting variations in the output levels of the photo sensors with reference to a white reference board. Then, the signals are applied to analogy to digital (A/D) converters. The parallel output signals of colors R, G and B derived from the A/D converters are arranged into R/G/B one line processor 34. In the figure, reference numeral 30 designates photo sensors; 31 amplifiers; 32 shading correction circuits; 33 analog to digital (A/D) converters; 34 an R/G/B one lined processor; and 35 gamma correction circuits.

The gamma correction circuit 35 arranges the graduations in gray level of the reflected light amount data in accordance with the visual response of the eye. If necessary, the image processing section may contain the gamma correction function.

Figure 10:
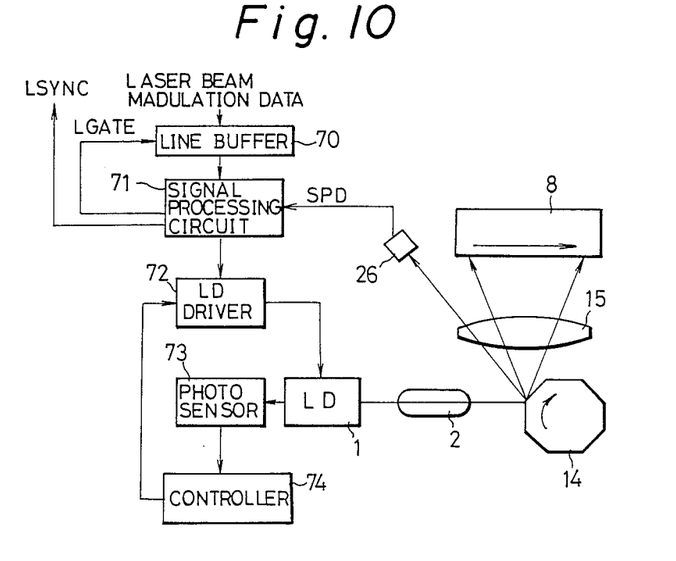
FIG. 10 is a block diagram showing a laser beam modulation system employed in the copying machine of FIG. 1.

The image processing section is illustrated in block form in FIG. 10. The scanner data of colors R, G and B are converted into their complementary colors yellow (Y), magenta (M) and cyan (C). The conversion is done by a complementary color converter. A color correction circuit applies the masking to the complementary color signals, allowing for the spectral characteristics of the coloring materials of toner. A UCR replaces the whole or part of each of the equal-weight components Y, M and C in a certain region of color, with an equivalent black (Bk) (called a black print), thereby to generate Y, M, C and Bk signals.

In the succeeding data converting section, various image processings are performed, such as gradation conversion of the output image, filtering, enlargement/reduction, editing, and color conversion.

The dummy data, which is essential to the present invention, is generated in this data converting section.

A laser beam modulating signal that is generated in the image processing section is transferred to a laser beam modulator. Before proceeding with the laser beam modulation, a laser beam scanning optical system will be described, which is used in the copying machine of FIG. 1.

The color copying machine of FIG. 1 is featured in that the photosensitive drums are provided corresponding to the developing colors, and the laser devices are driven by the color signals, and therefore, the formation of the images of those colors progress simultaneously.

Figure 9:
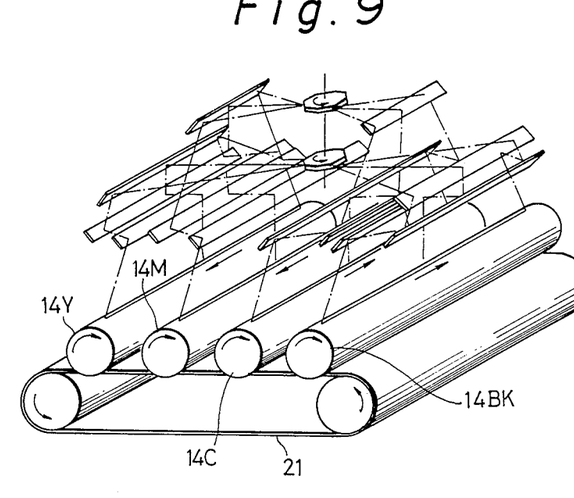
FIG. 9 is a perspective view showing a partial structure of the copying machine of FIG. 1 including the scanner section and the photosensitive drums, the illustration best showing the directions of laser beams of different colors.
Figure 11:
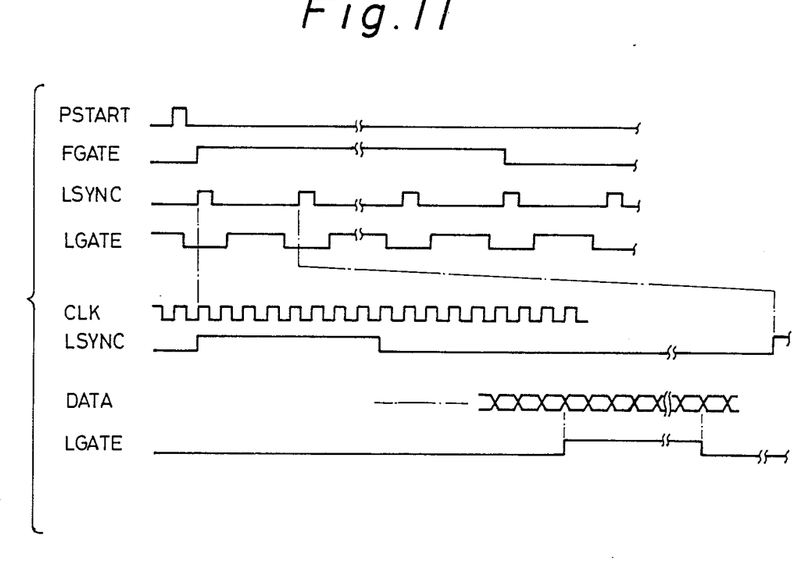
FIG. 11 shows a set of pulses useful in explaining the operation of the modulation system shown in FIG. 10.

As seen from FIG. 9, the respective colors have their own scanning directions. For this reason, the image data is reversed. To this end, the synchronous detecting means are provided for the color beams, respectively. These synchronous detecting The modulation of the laser beam will be described with reference to FIGS. 10 and 11. With rotation of the rotating mirror scanner 14, the laser beam scans the surface of the photosensitive means 8. The beam is sensed by the photo sensor 2, that is mounted at one end of an equivalent image forming face of the beam. The photo sensor 2 produces a signal SPD every scanning line. A signal processing circuit 71 receives the signal SPD and produces a line synchronous signal LSYNC. The signal LSYNC is also applied to the image processing section 10. In synchronism with the signal LSYNC, the image processing section 10 provides the modulation data of one line for transmission to a line buffer 70. The circuit 71 reads out the modulation data of one line from the buffer 70 in synchronism with the line synchronous signal LSYNC, and applies it to an LD driver 72. The LD driver 72 drives a light diode (LD) 1 for modulation purposes. The reason why the line buffer 70 is provided is that a transfer rate of the modulation data transferred from the image processing section 10 is different from that of the modulation data to the signal processing circuit. Such a transfer rate as to allow the modulation data of one line to be transferred during a period between two adjacent line synchronous signals suffices for the former transfer rate. The latter transfer rate must be selected by taking into consideration many factors including the intervals of the synchronous signal LSYNC, rate of effective scanning period, and write density. Generally, the former may be slower than the latter. Such a selection of the transfer data will provide a reliable transfer of the modulation data. Thus, the line buffer 70 is used in order to buffer the difference between the two transfer rates.

A photo sensor 73 and a controller 74 are provided for power control purposes, when a laser diode (LD) is used as the laser light source. More specifically, these circuits cooperate to keep a reference power of the laser beam modulated by the LD driver 72 at a fixed value. The sensor 73 receives a laser beam power emitted from the LD 1, and produces an electric signal of the laser beam power. The controller 74 controls an injection current to the LD so that the signal from the sensor 73, i.e., the beam power, becomes constant in value.

Figure 12:
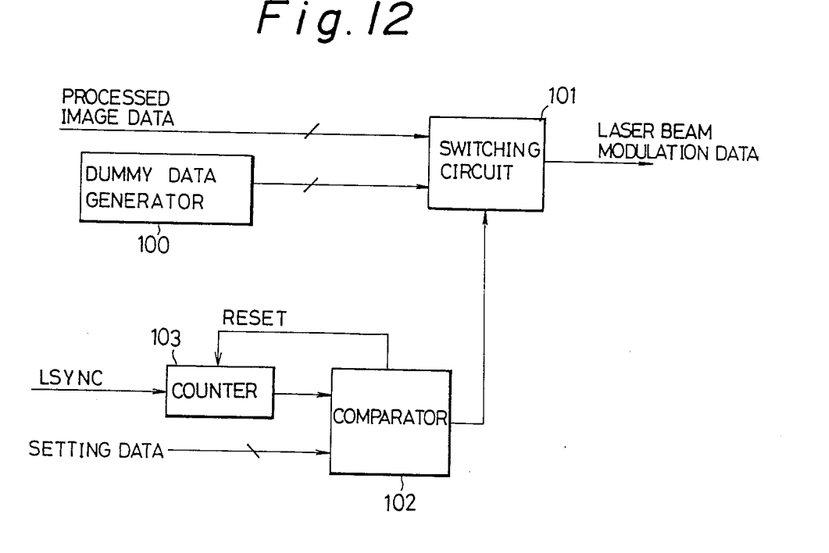
FIG. 12 shows a block diagram of a data switching circuit of a data converting portion in the image processing section of the copying machine of FIG. 1.
Figure 13:
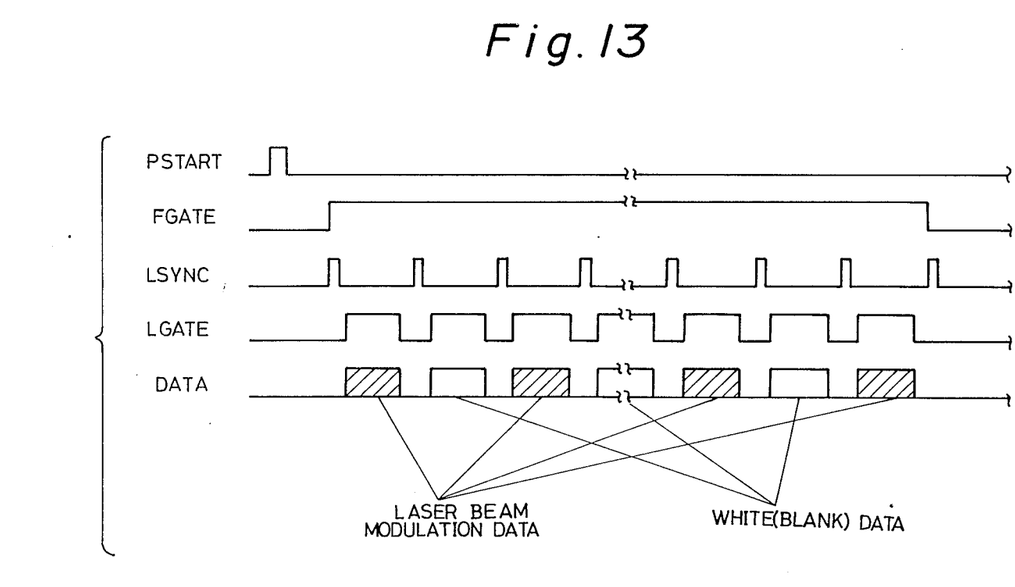
FIG. 13 shows a set of pulses useful in explaining the operation of the data switching circuit shown in FIG. 12.

The concept of the present invention will be described with reference to FIGS. 12 and 13. As seen from a timing chart of FIG. 13, which shows the operation of the copying machine when the linear velocity is set to ½, and corresponds to that of FIG. 11, white data and modulation data are alternately arranged. When a mode select key on the operation board, such as a high quality mode key, gloss mode key, and OHP mode key, is operated, the scanning speed of the scanner and the linear velocity of the printer are set to preset values, for example, ½ or ⅓ of the original value. The conditions of the development, transfer, fixing etc., are set to appropriate values. To set the linear velocity to 1/N, as a setting data N is set to a data switching portion of the data converting unit in the image processing section 10. See FIG. 12. When a count of a counter 103 counting the line synchronous signal LSYNC reaches N, a comparator 102 turns on a switching circuit 101. At this time, the circuit 01 allows the processed data to pass therethrough as laser modulation data to the succeeding stage, i.e., the buffer line 70. When the counter 103 produces any of other counts than N, the circuit 01 allow the dummy data to pass therethrough as the laser beam modulating data to the succeeding stage. The dummy data is generated by a dummy data generator 100. The dummy data functions to stop the operation of the laser LD. The copying machine of the laser scanning type comes in two varieties, a positive/positive developing type copying machine and a negative/positive developing type copying machine. In the former type of the copying machine, a positive image reflecting a spatial distribution of brightness of an original image is exposed to light. The unexposed portion of the image are developed. In the latter type of the copying machine, a negative image reflecting the inversion of a spatial distribution of brightness of an original image is exposed to light. The exposed portion of the image is developed. The correspondence of ON and OFF of the laser to the presence and absence of the image data is determined depending on the type of the copying machine, the positive/positive developing type or the negative/positive type developing type. The copying machine generally does not employ both the types of the copying machines. In this instance, therefore, the dummy data as generated consists of only fixed data, such as black (positive/positive developing type) or white (negative/positive developing type).

The above description applies only to the switching of the image data. The laser drive is little influenced by the signal other than the signal of the image data, i.e., the signal concerning the non-image area. For example, in the positive/positive developing type copying machine, the laser is always turned on, in order to prevent a non-image part on the image-transferred means from being developed. However, the above operation is not influenced by the switching operation. Thus, the laser scanning is reduced to about 1/N. This is equivalent to that the number of mirror faces "f" of the rotating mirror scanner is reduced to 1/N. The data switching portion of FIG. 12 may be contained in the image processing section 10 or the printer section 3, if required.

The transmission data of the scanner section 9 is also reduced to 1/N. The scanning speed Vs of the scanner section 9 is 1/N. The clock signal in the scanner section 9 remains unchanged. Accordingly, the pixel size Ps in the vertical scanning direction is 1/N, as seen from the equation (4). The number of the line data is N times the original one. Consequently, only the pixel size Ps is changed by setting the data of N.

As seen from the equation (3), the pixel size Ps can be maintained by "N . charge storage time $t_{CCD}$". This approach, however, requires considerably complicated design work, for example, change of the clock signal, change of the data transfer rate resulting from the clock signal change, and altering of illumination conditions.

According to the present invention, the reading pixel size Ps is changed but the sampling pitch remains unchanged. The inventor perceives the fact that it is little influenced by degradation of MFT by the sampling theorem, and selected the means that requires less complexity of the machine construction.

Substantially the effects resulting from the elongation of the charge storage time $t_{CCD}$, can be obtained by the scanner section 9 provided with optoelectrical elements arranged in one line extended laterally to a predetermined scanning direction for optically receiving an image of the original through the optoelectrical elements. The optoelectrical elements are carrying out a scanning operation in the predetermined scanning direction with varied scanning speed by changing a sweep spacing of an image data with averaging every N line of the image data in accordance with the operation mode with using every N−1 lines of the image data to reproduce the image of the original on the image forming medium. The N−1 lines used would be discarded after carrying out the averaging process.

Further, it can reduce the tendency that, due to the high frequency image noise, the image is likely to be noisy. The above processing can readily be realized by using N buffer lines. Actually, however, it is rather simpler to use a dither matrix exclusively used, by which the average processing of the data in every N line is performed during the image processing. The averaging processing of the image data in every N line may be substituted by controlling the weighting in the sub-scanning direction in the dither processing for image smoothing and edge emphasis.

The disadvantages of the present invention are negligible when comparing with the great advantages of the improved image quality resulting from the decreasing the linear velocity of the fixing rollers. Further, the implementation of the present invention requires less alteration of the construction of the conventional copying machine construction.

The effects resulting from the reduction of the linear velocity of the photosensitive means, in addition to that of the fixing rollers, will be described. No excessively extended transport path is required, leading to reduction of the size of the machine. This is very important especially for the copying machine of FIG. 3. The writings and transfer of four colors progress in parallel, providing a high speed copying operation. The straight transfer path allows use of thick paper.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reproducing apparatus for reproducing an image of an original by scanning the original to form an image of the original on a image forming medium and by fixing the formed image on the medium, a scanning speed of the scanning operation being variable in synchronization with a fixing speed of the fixing operation, said apparatus comprising:
   means for selectively setting the fixing speed in accordance with a desired mode of operation;
   scanning means provided with optoelectrical elements arranged in one line extended laterally to a predetermined scanning direction, for optically receiving an image of the original through said opto-electrical elements, said optoelectrical elements carrying out a scanning operation in said predetermined scanning direction to produce an image data representing a whole image of said original, an electrical scanning speed of said opto-electrical element being varied by changing a sweep spacing of said image data while a mechanical scanning speed of said optoelectrical elements being kept at a constant; and
   means for fixing a reproduced image of an original image formed on said image forming medium at variable fixing speed in accordance with said operating means.

2. An apparatus according to claim 1, said image reproducing apparatus further comprising:
   image processing means for producing a modulation signal in accordance with said image data so as to control a moving speed of said image carrier member;
   exposure means for producing an image forming signal from said modulation signal so as to reproduce a latent image of said original image on said image carrier member by said image forming signal at a speed variable with said fixing speed;
   developing means for developing said latent image on said image carrier member; and
   transferring means for transferring a developed image to said image forming medium from said image carrier member at a speed controlled by said fixing speed setting means.

3. An apparatus according to claim 1, wherein said scanning speed of said scanning means is varied by using means for changing a sweep spacing of said image data with averaging every N line of said image data in ain said predetermined scanning direction with using every N−1 lines of said image data in accordance with said desired mode of operation.

4. An apparatus according to claim 3, wherein said sweep spacing changing means is using a dither matrix for averaging said every N line.

5. An apparatus according to claim 3, wherein said sweep spacing changing means is using a dither processing with a weighting for an image smoothing and/or an edge emphasis for averaging said every N line.

6. An apparatus according to claim 2, wherein said image processing means produce a modulation signal of controlling said moving speed of said image carrier member so as to vary said speed of said image carrier member synchronously in accordance with said with said operating means.

7. An apparatus according to claim 1, wherein said image processing means include data converting means for receiving said image data from said image reading means, for converting said image data into a modulation signal, and for producing said modulation signal to said exposure means,
   data control means for controlling said modulation signal from said data converting means so as to control a sweeping speed of image reproducing signal emitted from said exposure means on said image carrier member; and
   power control means for controlling said modulation signal from said data converting means and for outputting said modulation signal to said exposure means so as to stabilize a power of said image forming signal produced from said exposure means.

8. An apparatus according to claim 7, wherein said data control means includes
   detecting means for detecting said image forming signal produced by said exposure means, and for producing a detection signal,
   signal processing circuit for producing a first synchronous signal to control said data converting means for producing said modulation signal synchronously with said detection signal, and for producing a second synchronous signal to output said modulation signal as inputted by said first synchronous signal,
   buffering means for compensating a difference between a first transfer rate of said modulation signal transferred from said data converting means to said data control means and a second transfer rate of said modulation signal transferred to said signal processing circuit therefrom, and
   an exposure control circuit for receiving said modulation signal from said signal processing circuit and for producing said modulation signal to said exposure means so as to control said signal scanning speed on said image carrier member.

9. An apparatus according to claim 7, wherein said data control means include
   counting means for counting said first synchronous signal from said signal processing circuit,
   comparing circuit for comparing said first synchronous signal from said counting means with a data for designating a change of said signal scanning speed when said first synchronous signal is coincident with said data for designating a change of said signal scanning speed, said comparing circuit resetting said count means and producing a first switch signal, and when said first synchronous signal is not coincident with said data for designating a change of said signal scanning speed, said comparing means producing a second switch signal,
   a dummy data generating circuit for generating dummy data and for burning off said exposure means so as to control said moving speed of said image carrier member synchronously in accordance with said desired mode of operation, and
   a switching circuit responding to said first switching signal for converting said image data produced from said scanning means into said modulation signal, for outputting said converted modulation signal to said buffering means, and also responding to said second switching signal for converting said dummy data into said modulation signal so as to control said moving speed of said image carrier member synchronously in accordance with said desired mode of operation.

10. An apparatus according to claim 7, wherein said power adjusting means include
- a power detector for receiving said image forming signal produced by said exposure means and for producing a power adjusting signal in accordance with said image forming signal, and
- a control circuit for stabilizing said power of said image forming signal by controlling said data signal transferred from said signal processing circuit to said exposure means in accordance with said power adjusting signal.

11. An apparatus according to claim 2, wherein said exposure means include a laser for generating said image forming signal, and a rotating mirror scanner for reflecting said image forming signal produced by said laser and for applying said image signal to said image carrier member.

12. An apparatus according to claim 1, wherein said mode of operation includes an operation for forming a color image on said image forming medium.

13. An apparatus according to claim 1, wherein said mode of operation includes an operation for reproducing said image of said original on a sheet for an overhead projector.

14. An apparatus according to claim 1, wherein said image forming medium is a sheet of a copying paper.

15. An apparatus according to claim 1, wherein said image carrier member is a roller with photosensitive materials.

16. An apparatus according to claim 2, wherein said image forming signal is a light signal.

* * * * *